J. M. ROBERTS.
TRACTION WHEEL.
APPLICATION FILED MAY 18, 1908.
903,231.
Patented Nov. 10, 1908.
3 SHEETS—SHEET 1.
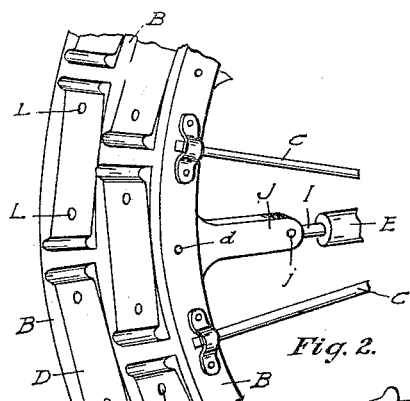
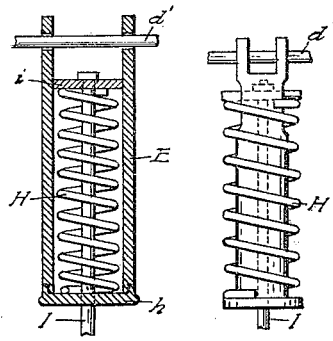
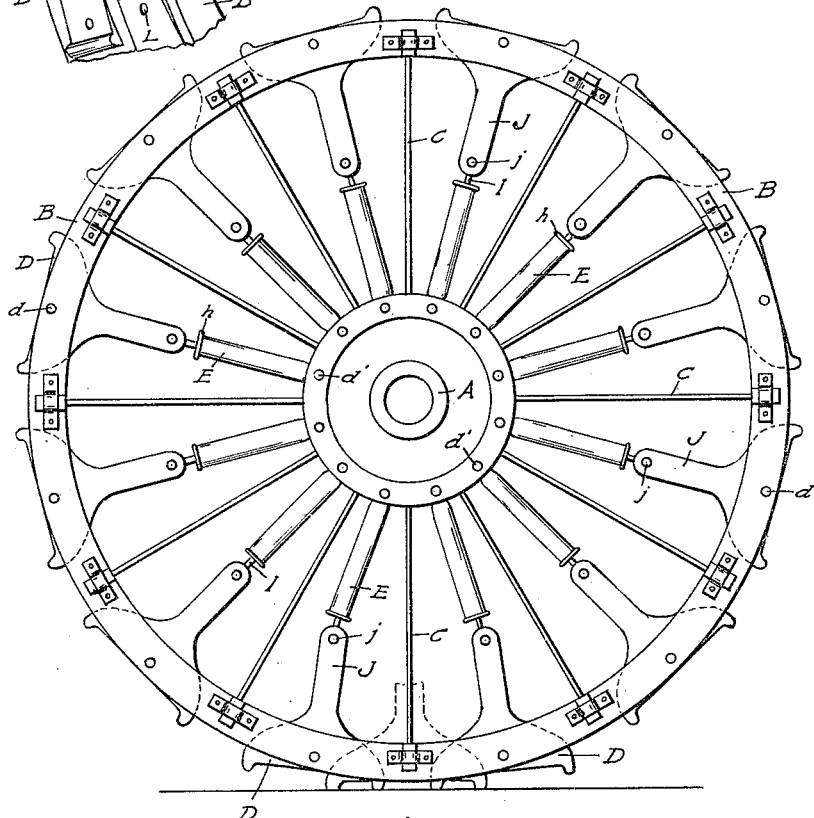
WITNESSES:
A. B. Cornelius
Emma Hickel
INVENTOR:
James M. Roberts
BY Eugene Ayres,
ATTORNEY

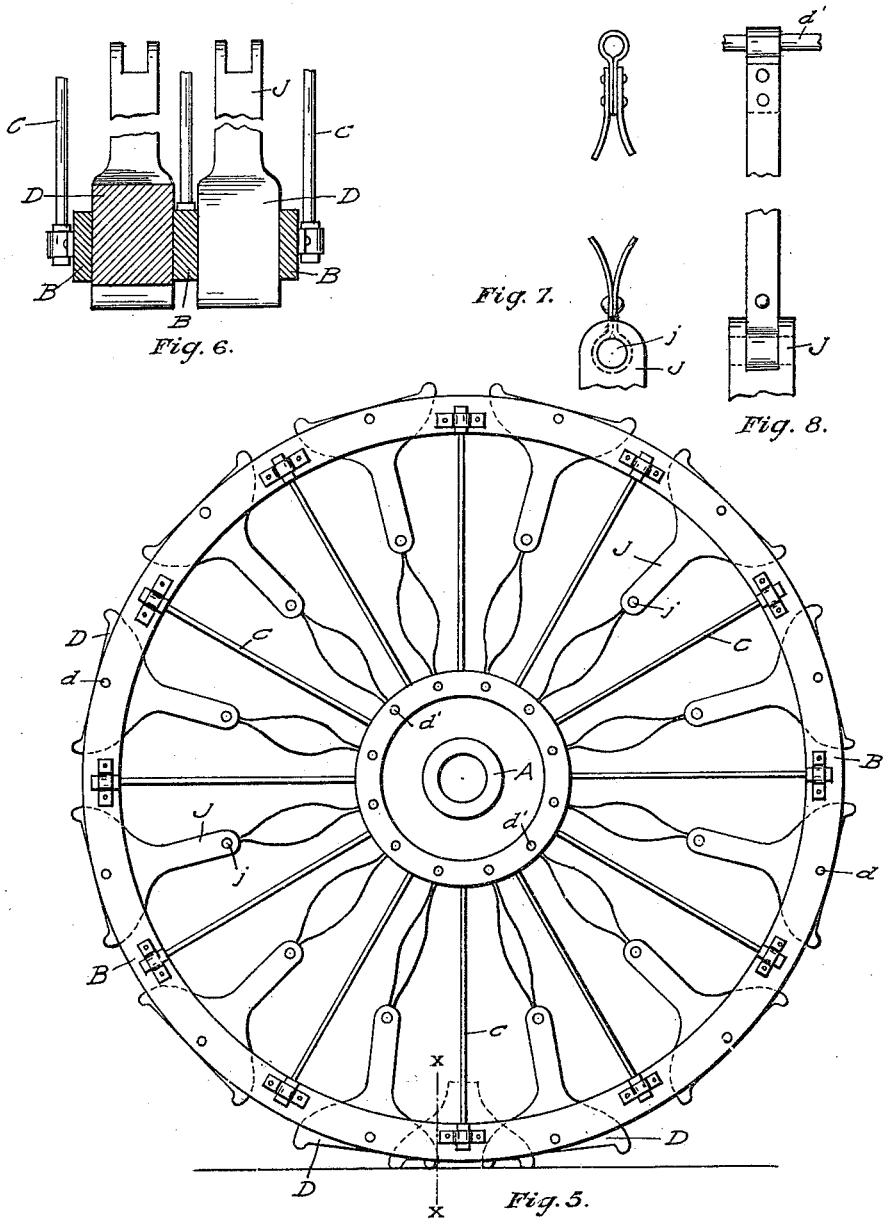

J. M. ROBERTS.
TRACTION WHEEL.
APPLICATION FILED MAY 18, 1908.

903,231.

Patented Nov. 10, 1908.
3 SHEETS—SHEET 3.

WITNESSES:
A. B. Cornelius
Emma Heckel

INVENTOR:
James M. Roberts
BY Eugene Ayres
ATTORNEY

UNITED STATES PATENT OFFICE.

JAMES M. ROBERTS, OF BUCHANAN COUNTY, MISSOURI.

TRACTION-WHEEL.

No. 903,231.     Specification of Letters Patent.     Patented Nov. 10, 1908.

Application filed May 18, 1908. Serial No. 433,449.

*To all whom it may concern:*

Be it known that I, JAMES M. ROBERTS, a citizen of the United States, residing in the county of Buchanan and State of Missouri, have invented certain new and useful Improvements in Traction-Wheels, of which the following is a specification.

The object of my invention is to provide a traction wheel especially adapted for use on heavy slow geared machines and I accomplish my object by the mechanism illustrated in the accompanying drawings, in which:—

Figure 14:
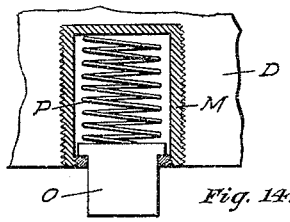
Figure 10:
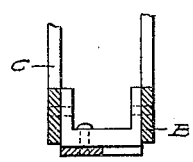
Figure 9:
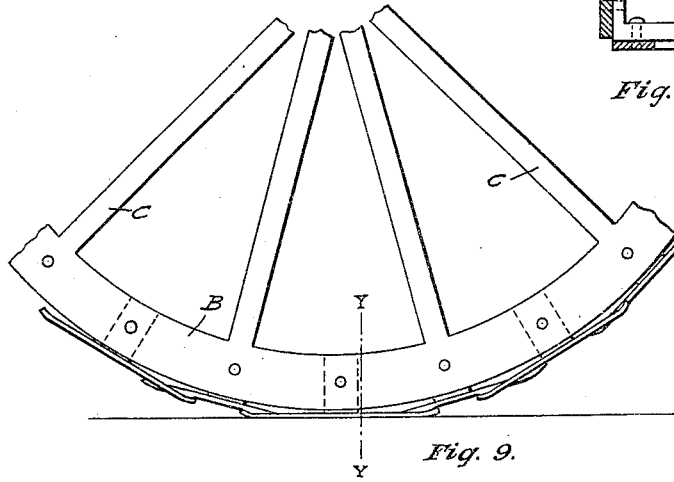
Figure 11:
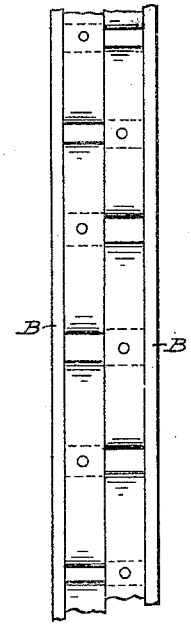
Figure 12:
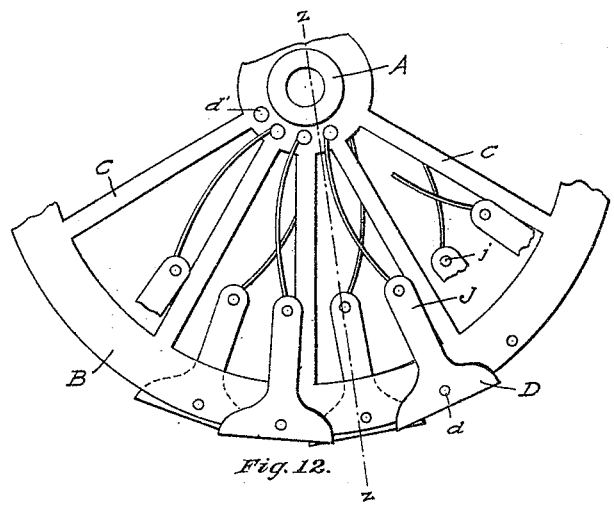
Figure 13:
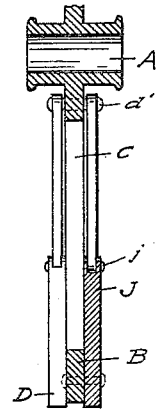

Figure 1 is a side elevation of a wheel shown in contact with the ground; Fig. 2 is a segmental perspective view of a wheel; Fig. 3 is a sectional detail view of a spring retained in a tube; Fig. 4 is a detail view of a spring retaining device in a different form; Fig. 5 is a side elevation of a wheel corresponding with that shown in Fig. 1, except that double curved springs are substituted for spiral springs; Fig. 6 is a section view of a wheel on line $x$—$x$ in Fig. 5; Fig. 7 is a detail of a curved spring; Fig. 8 is a front view of the spring shown in Fig. 7; Fig. 9 is a partial side elevation of a forward truck wheel showing flat spring feet therein; Fig. 10 is a section view of Fig. 9 on line $Y$—$Y$; Fig. 11 is an elevation of the tread and feet of the wheel seen in Fig. 9; Fig. 12 is a partial side elevation of a forward truck wheel showing a different form of construction; Fig. 13, is a section of the wheel seen in Fig. 12, shown in line $z$—$z$, and Fig. 14 is a sectional detail of a foot push button.

Similar letters refer to similar parts in the several views.

In the drawings, A is the hub of a wheel, B B are rims set edgewise and C C are spokes held in rigid position by the hub and rim.

The device may be constructed with one rim, as shown in Fig. 12, two rims as shown in Fig. 11, or with three rims, as shown in Fig. 2.

D D are triangular metal feet each pivotally connected with the rim or rims by an axle $d$.

E E are tubes the upper end of each pivotally connected with hub A by an axle $d'$. A spiral spring H is confined in said tube by a cap nut $h$ at the bottom with a perforation therein to permit a rod I provided with a slide nut $i$ at its top end to pass vertically through said spring. A leg J extending upward from said foot is provided with perforations through its top. Through each of said perforations there is a bolt $j$ with which an eye in the bottom end of rod I engages loosely, said bolt serving as an axle. The bottom of the feet are flat, except when it is desired to provide heels with corks for use on country roads. As shown in Fig. 1, each foot makes two turns on its axle, one turn forward with the roll of the wheel and one turn backward reverse with the roll of the wheel: As the wheel rolls over, it thereby makes two pulls on the spring by throwing the spring from a straight line to an obtuse angle, and as the feet are placed around the rims, preferably in two rows, with the axle of each foot half way between the heel and toe of the two feet on opposite sides, three feet are always in contact with the ground: Two are pulling on springs at the same time, one in front of the center of the bottom of the wheel, another behind the center of the bottom of the wheel, thereby when rolling giving elasticity, while a third foot is flat on the ground giving the wheel broad bearing surface, small penetrating force to sink in mud or soft earth and great traction power to hold on slick surfaces and to run over bridges without injuring the floors.

To prevent mud from caking on the bottoms of the feet they are provided with threaded holes L L, into which threaded sleeves M M are screwed, which sleeves carry buttons O O. These buttons extend slightly below the flat bottoms of the feet, are compressed up into the sleeves as each foot strikes the ground and when released by the passage of the foot off the ground is driven out of the sleeve by a spring P, thus loosening and scattering the mud that has gathered on the bottom of the foot.

Without changing the purpose or scope of my invention I desire to reserve the right as a mere mechanical change to construct the wheels with either one, two or three rows of feet and rims, to substitute for the spiral spring a flat spring with single or double curve, as shown in Figs. 12 and 5, and also to substitute for use on forward trucks flat spring feet simply attached to cross sections between two rims as illustrated in Fig. 9, instead of the feet D D, and to substitute the construction for supporting the spring, shown in Fig. 4 for that shown in Fig. 1.

What I claim and desire to secure by Letters Patent, is:—

1. In a traction wheel the combination with a hub and a plurality of spokes, of rims set edgewise, triangular feet, the pivots supporting said feet between said rims, tubes and the axles at the top ends thereof to support the same to said hub, the rods and springs operating in said tubes, the slide nuts at the tops of said springs and the cap nuts at the bottom of said tubes to retain said spring and provided with a perforation to permit the lower ends of the rods to pass through, the axles through the tops of said legs with which said rods engage, permitting the forward and backward movement of the feet and springs and tubes as a foot contacts with the ground, substantially as set forth and shown.

2. The combination with a traction wheel, of a foot and leg having a triangular contour pivotally supported to the rim of a wheel, a spring having pivotal connection with the top of said leg and with the hub to secure adaptability of the foot as it contacts with the ground as the wheel revolves, substantially as shown and described.

3. The combination with the foot of a traction wheel provided with a threaded hole, of a threaded sleeve screwed therein, a mud cleaning button carried thereby adapted to be compressed into said sleeve as the foot strikes the ground and a spiral spring within said sleeve by which said button is driven somewhat below the mouth of said sleeve when the foot is released from contact with the ground, substantially as shown and set forth.

In testimony whereof I affix my signature in presence of two witnesses.

JAMES M. ROBERTS.

Witnesses:
   S. S. ALLEN,
   H. L. MITCHELL.